United States Patent
Horiguchi

(10) Patent No.: US 8,168,312 B2
(45) Date of Patent: May 1, 2012

(54) MAGNETIC RECORDING MEDIUM AND A METHOD OF MANUFACTURING THE SAME

(75) Inventor: Michiko Horiguchi, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 308 days.

(21) Appl. No.: 12/026,126

(22) Filed: Feb. 5, 2008

(65) Prior Publication Data

US 2008/0187779 A1 Aug. 7, 2008

(30) Foreign Application Priority Data

Feb. 5, 2007 (JP) ................................. 2007-025838
Jul. 27, 2007 (JP) ................................. 2007-196018

(51) Int. Cl.
*G11B 5/66* (2006.01)
(52) U.S. Cl. ...................... 428/833.2; 428/835; 427/131
(58) Field of Classification Search .................. None
See application file for complete search history.

(56) References Cited

U.S. PATENT DOCUMENTS

| 2006/0183004 A1* | 8/2006 | Hattori et al. ............ 428/833.1 |
| 2006/0196625 A1* | 9/2006 | Wang et al. ..................... 164/1 |

FOREIGN PATENT DOCUMENTS

| JP | 2005-158092 A | 6/2005 |
| JP | 2006-31850 A | 2/2006 |
| JP | 2006-31852 A | 2/2006 |
| JP | 2006-031854 A | 2/2006 |
| JP | 2006031850 A * | 2/2006 |
| JP | 2006-092632 A | 4/2006 |
| JP | 2006-228282 A | 8/2006 |

OTHER PUBLICATIONS

Office Action Issued in Corresponding Japanese Patent Application No. 2007-196018, dated Oct. 25, 2011. Partial Translation provided.

* cited by examiner

*Primary Examiner* — Holly Rickman
(74) *Attorney, Agent, or Firm* — Rossi, Kimms & McDowell LLP

(57) ABSTRACT

A magnetic recording medium and a method of manufacturing a magnetic recording medium are provided, in which degradation of wear resistance against a magnetic head and performances of the medium is restrained, and metal dissolving out of the magnetic recording layer and degradation of corrosion resistance due to low coverage of a protective layer are suppressed. The method of manufacturing provides a magnetic recording medium having a convex portion of a magnetic recording layer for recording information and a concave portion without a recording function on a disk substrate. An ALD protective layer is formed on the magnetic recording medium using an ALD method. The magnetic recording medium has a convex portion of a magnetic recording layer for recording information and a concave portion without a recording function on a disk substrate, and has a protective layer formed by an ALD method on the concavo-convex pattern.

14 Claims, 8 Drawing Sheets

Simulation result on thickness ratio

MAGNETIC RECORDING MEDIUM AND A METHOD OF MANUFACTURING THE SAME

CROSS-REFERENCE TO RELATED APPLICATION

This application is based on, and claims priority to, Japanese Patent Application No. 2007-025838, filed on Feb. 5, 2007 and Japanese Patent Application No. 2007-196018, filed on Jul. 27, 2007 contents of both of which are incorporated herein by reference.

BACKGROUND

The present invention relates to a magnetic recording medium and a method of manufacturing a magnetic recording medium. In particular, the invention relates to a method of manufacturing a magnetic recording medium for a discrete track medium (DTM) and a bit-patterned medium (BPM) in which a recording layer has a concavo-convex pattern.

A magnetic recording medium has a protective layer on a magnetic recording layer for protecting the recording layer from damages due to contact and sliding of a magnetic head and from corrosion. Conventional magnetic recording media comprise a soft magnetic layer and other magnetic and nonmagnetic layers laminated on a flat substrate and a protective layer deposited on the magnetic layers.

Materials for the protective layer include a diamond like carbon (DLC) film, a nitride film, and an oxide film such as $SiO_2$ film. Methods for forming the protective layer include a sputtering method, a plasma CVD method, and a thermal CVD method.

Comparing a DLC film formed by a sputtering method with a DLC film formed by a CVD method, a DLC film formed by a CVD method is denser and harder. This is because the DLC film formed by a CVD method, which is formed of hydrocarbon radicals, tends to take a three dimensional and rigid tetrahedral structure that is produced through hydrogen atoms. The CVD method is considered to bring about better film forming characteristic on a trench structure (a structure having a groove) than the sputtering method.

In order to obtain a next generation medium with an enhanced surface recording density, developmental efforts are being made on discrete track media (DTM) having a concavo-convex pattern and bit patterned media (BPM) having a pattern of dotted configuration in the magnetic recording layer, the parts of the magnetic recording layer of the both types of media consisting of parts, each part being isolated from the adjacent parts of the magnetic recording layer.

In the case of the DTM, a protective layer is deposited on a surface of a concavo-convex pattern. Readiness of the film deposition is different between on the top of the convex portion, the side wall, and the bottom of the concave portion. A film of the protective layer is relatively hard to deposit on the side wall of the convex portion and on the bottom of the concave portion of the concavo-convex configuration. The thickness of the protective layer on these parts is apt to be thin and to generate pin-holes. This degraded coverage of the protective layer causes corrosion of metal out of the magnetic recording layer and degradation of corrosion resistance. A method is known in which an angle of the object is changed for a film of the protective layer to deposit easily on the side wall of the convex portion and the bottom of the concave portion. The method however, results in a decreased film thickness on the top of the convex portion and degrades flatness, and thus, deteriorates wear resistance against the magnetic head or read-write performance.

Japanese Unexamined Patent Application Publication No. 2006-031852 (JP 2006-031852) has proposed a magnetic recording medium comprising a magnetic recording layer in a patterned configuration, a first carbon protective film formed on the patterned magnetic recording layer, a nonmagnetic layer filling the grooves that makes isolations in the magnetic recording layer, and a second carbon protective layer formed on the first carbon protective film and the magnetic layer. The nonmagnetic layer filling the grooves overcomes the problem that a film of the protective layer is hardly deposited on the side wall of the convex portion and the bottom of the concave portion. The top of the convex portion, which is most liable to be damaged, is protected by the double layers of the first carbon protective film and the second carbon protective film.

Meanwhile, in the field of semiconductor technology, a so-called atomic layer deposition (ALD) method has been recently employed, which provides a method of depositing a film with good coverage on a structure with irregular configuration. This film deposition method deposits one atomic layer at a time so a thin film can be deposited uniformly.

The part closest to the flying head (the top of the convex portion) is necessarily covered by a film that is dense, hard, and exhibits good wear resistance, such as a DLC film. The protective layer needs both satisfactory coverage and wear resistance (slide resistance).

Japanese Unexamined Patent Application Publication No. 2005-158092 (JP 2005-158092) has proposed a magnetic recording medium and a method of manufacturing the medium, the medium comprising a protective layer that can be made thin and exhibits satisfactory corrosion resistance and durability, and allows high density recording. In the method of JP 2005-158092, a first protective film is formed by a vacuum deposition process such as CVD or FCA (filtered cathodic arc), and then a second protective film is formed with a raised substrate bias voltage. JP 2005-158092 discloses a method to form a protective layer on a flat magnetic layer by means of an ALD method. This film deposition method deposits one atomic layer at a time so a thin film can be deposited uniformly.

The method of JP 2006-031852 provides a structure effective for improving wear resistance. In order to enhance recording density, the distance between the head and the magnetic layer is desired to be narrow, which requires a thin protective layer. The double layer structure as disclosed in JP 2006-031852 limits decreasing the thickness of the protective layer.

In addition, the ALD method cannot deposit a carbon film in a temperature range in which a magnetic layer is not deteriorated. In the process of forming a protective layer on an irregular surface by employing a sputtering method or a CVD method of a prior art, the deposition of a protective film on the side wall becomes more difficult as the taper angle of the convex portion is increased, which occurs when an irregular pattern becomes increasingly fine. The method of JP 2005-158092 is only applied to deposition on a flat magnetic layer and discloses no means to form a uniform thin film on a surface with a concavo-convex pattern.

SUMMARY OF THE INVENTION

It would be preferable to provide a method of manufacturing a magnetic recording medium in which the top of the convex portion, which is most readily damaged, is covered by a protective film that is dense, hard, and exhibits satisfactory wear resistance, and the side wall of the convex portion and the bottom of the concave portion is covered without any fault such as a pin hole. This would suppress degradation of wear resistance against a magnetic head or deterioration of read-write performance and prevent corrosion of metal out of a magnetic recording layer and decay of wear resistance due to decrease in coverage.

A method of manufacturing a patterned magnetic recording medium according to the invention comprises a step of forming an ALD protective layer by means of an ALD method on a magnetic recording layer that has a convex portion for recording information and a concave portion that does not perform a recording function.

A patterned magnetic recording medium according to the invention comprises a convex portion for recording information, a concave portion that does not perform a recording function, and a protective layer on the convex portion and the concave portion, wherein the protective layer is composed of an ALD protective layer formed by an ALD method. Advantageously, a taper angle of the convex portion of the concavo-convex pattern is at least 60 degrees and the ALD protective layer is formed on a side wall of the convex portion with the taper angle of at least 60 degrees.

According to the invention, a dense ALD protective layer is formed in high coverage following the concavo-convex configuration of the magnetic recording layer. Therefore, a magnetic recording medium exhibits satisfactory corrosion resistance.

BRIEF DESCRIPTION OF THE DRAWINGS

The invention will be described with respect to certain preferred embodiments and the accompanying drawings, wherein.

DETAILED DESCRIPTION OF THE PREFERRED EMBODIMENTS OF THE INVENTION

Figure 1:
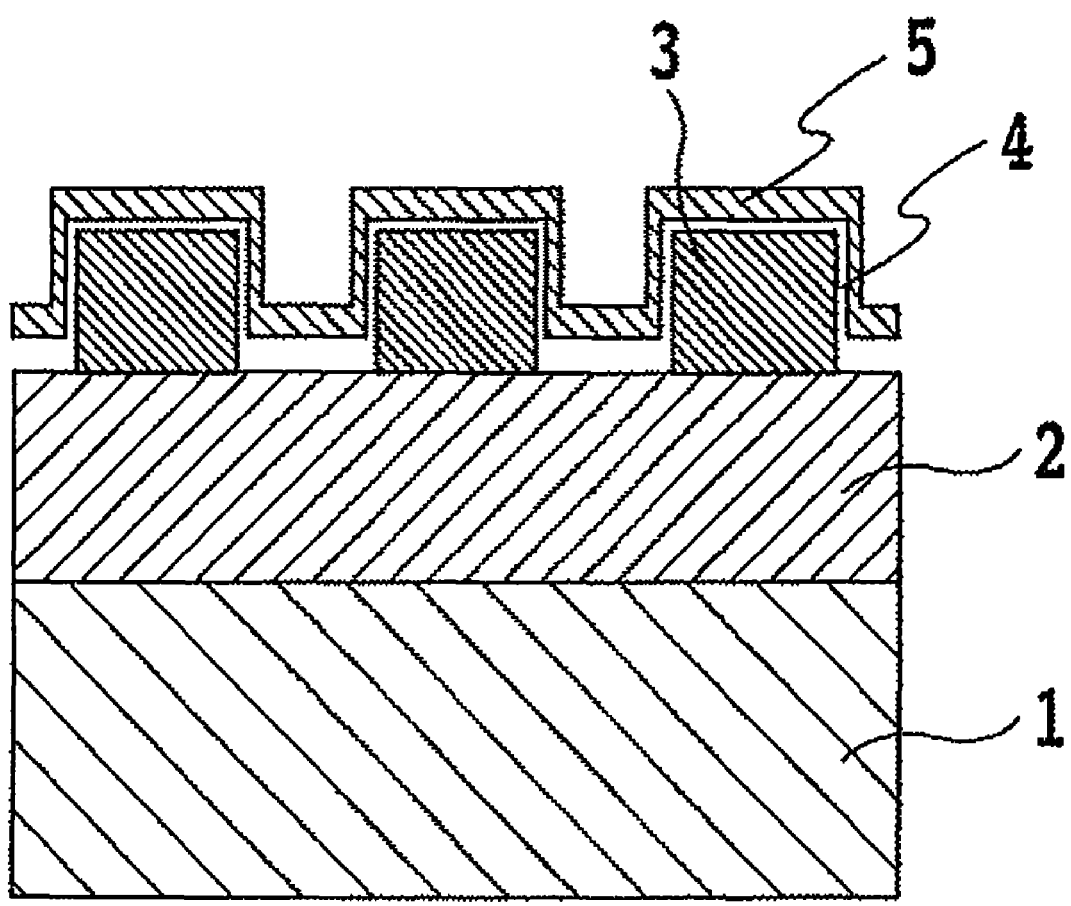
FIG. 1 is a sectional view showing a basic structure of a magnetic recording medium of the invention.

FIG. 1 is a sectional view showing a basic structure of a magnetic recording medium of the invention. The magnetic recording layer shown in FIG. 1 comprises a substrate 1, a layer 2 including a soft magnetic layer, and other magnetic and nonmagnetic layers provided on the substrate 1, and a magnetic recording layer 3 patterned in a predetermined pattern formed on the layer 2. A concavo-convex pattern is formed on the surface of the magnetic recording layer 3. The layer 2 including a soft magnetic layer and other magnetic and nonmagnetic layers in this specification means the aggregate of a part of magnetic recording layer that remains unpatterned and a soft magnetic layer underlying the part of magnetic recording layer. The predetermined pattern can be a pattern of lines and spacings or a pattern of dots. A magnetic recording medium having a pattern formed in the pattern of lines and spacings is used for a DTM, and a magnetic recording medium having a pattern formed in the pattern of dots is used for a BPM.

The surface of the top and side of the convex portions of the magnetic recording layer 3 and the bottom of the concave portion, which does not exhibit a function to record information, are covered with an ALD protective layer 4 formed by means of an ALD method. A carbon protective layer 5 composed of a sputtered carbon film covers the ALD protective layer.

Figure 2A:
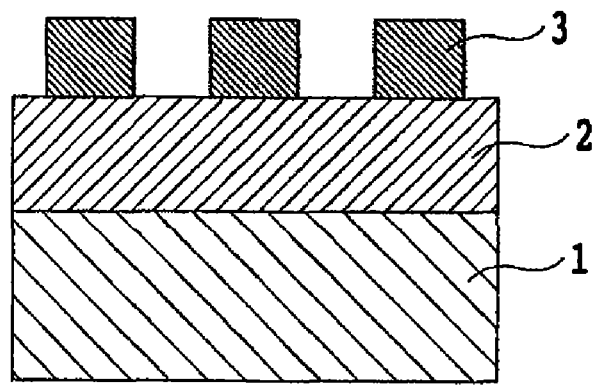
FIGS. 2(a), 2(b), and 2(c) show an embodiment example of a method of manufacturing a magnetic recording medium according to the invention.
Figure 2B:
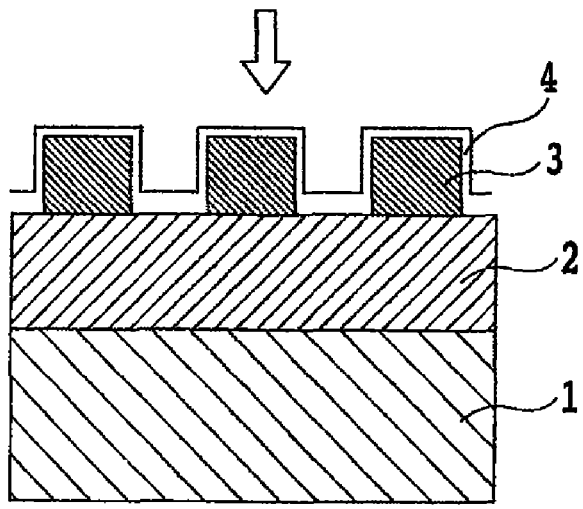
Figure 2C:
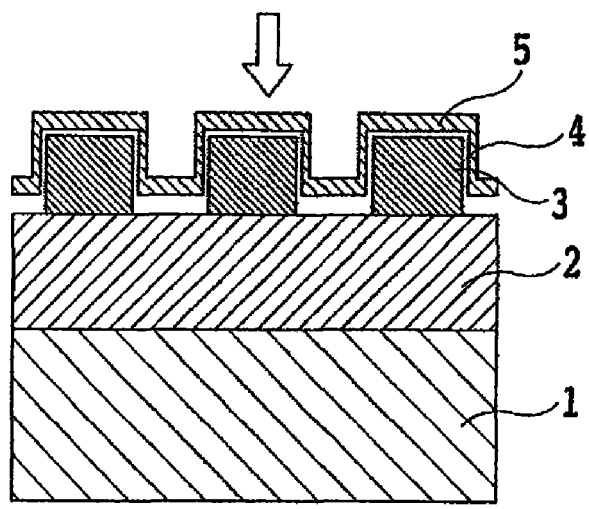

FIGS. 2(a), 2(b) and 2(c) show an embodiment example of a method of manufacturing a magnetic recording medium according to the invention. In the magnetic recording medium, first, as shown in FIG. 2(a), a magnetic recording layer 3 patterned to form a predetermined pattern is formed on the layer 2 including a soft magnetic layer and other magnetic and nonmagnetic layers formed on the substrate 1. The patterned magnetic recording layer 3 is formed by a nano-imprint lithography method. In the method, a resist resin is applied on the whole surface of a uniformly deposited magnetic recording layer. Then, a resist pattern is formed on the applied resist resin by pressing a separately prepared die having a pattern to be formed. Using the resist pattern as a mask, the magnetic recording layer is etched to obtain a patterned magnetic recording layer 3.

Next as shown in FIG. 2(b), a protective layer 4 is deposited by the ALD method on the surface of the magnetic recording medium having the concavo-convex pattern formed thereon. Materials that can be deposited by the ALD method include oxides such as $SiO_2$, $Al_2O_3$, $TiO_2$, and $HfO_2$, nitrides such as AlN, TiN, WN, and a metal film. Deposition by the ALD method can form a thin film that is excellent in thickness uniformity and pin-hole free. Moreover, the method is excellent in step coverage and thus, provides uniform film deposition regardless of irregularities on a substrate.

Next, as shown in FIG. 2(c), a carbon protective layer 5 is formed on the surface of the magnetic recording medium provided with the protective layer 4. The carbon protective layer 5 covers the top of the convex portions of the concavo-convex pattern closest to the flying head with hard carbon exhibiting good wear resistance, so that little degradation of characteristics occurs due to wear by the head. Besides, the ALD protective layer 4 deposited by the ALD method covers the bottom of the concave portions and side walls of the magnetic recording layer 3 on which a film is hardly deposited, so that little metal dissolution occurs out of the layer including a soft magnetic layer and other magnetic and nonmagnetic layers 2 and the magnetic recording layer 3 and negligible corrosion is expected. The embodiment of FIGS. 1 and 2(a) through 2(c) provides a magnetic recording medium with high coverage on the irregularities in the least number of steps.

Figure 3A:
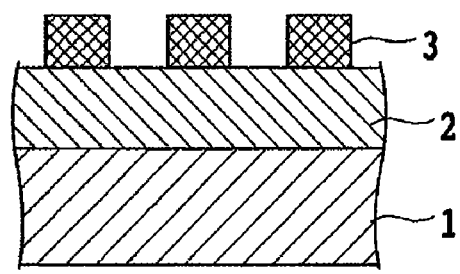
FIGS. 3(a) through 3(d) show another embodiment example of a method of manufacturing a magnetic recording medium according to the invention.

FIGS. 3(a) through 3(d) show another embodiment example of a method of manufacturing a magnetic recording medium according to the invention. In the magnetic recording medium, first as shown in FIG. 3(a), a magnetic recording layer 3 patterned to form a predetermined pattern is formed on a layer including a soft magnetic layer and other magnetic and nonmagnetic layers 2 provided on a substrate 1. The patterned magnetic recording layer 3 is formed by a nano-imprint method. In the method, a magnetic recording layer is formed on the whole surface of the layer 2 including a soft magnetic layer and other magnetic and nonmagnetic layers and a resist resin is applied on the whole surface of a uniformly deposited magnetic layer. Then, a resist pattern is formed on the applied resist resin by pressing a separately prepared die having a pattern to be formed. Using the resist pattern as a mask, the magnetic recording layer is etched to obtain a patterned magnetic recording layer 3.

Figure 3B:
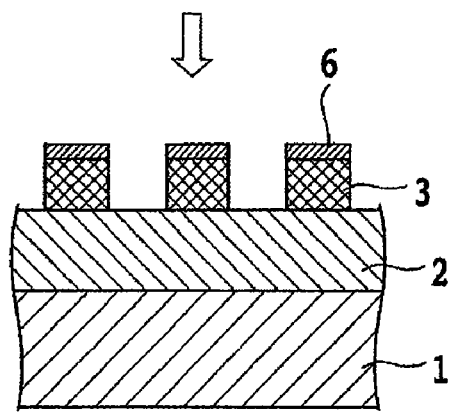

Then, as shown in FIG. 3(b), a resin mold mask 6 is installed on the top of the patterned magnetic recording layer 3 (the top of the convex portions of the concavo-convex pattern). The resin mold mask, which is removed after depositing a protective layer, is preferably not adhered to the magnetic recording layer 3, but only put on the magnetic recording layer 3. The resin mold mask can be fabricated by punching a resin film by nano-imprint mold, for example.

Figure 3C:
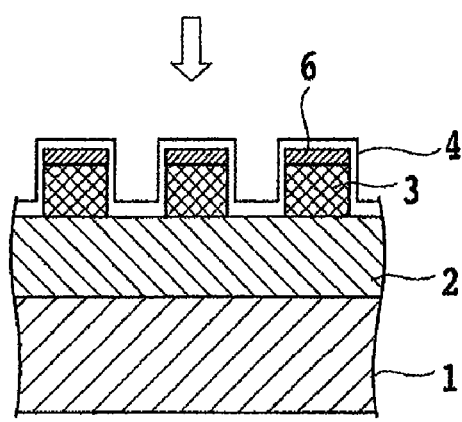

After installing the resin mold mask, an ALD protective layer 4 is deposited by the ALD method as shown in FIG. 3(c). The ALD protective layer 4 is deposited on the magnetic recording medium having a concavo-convex pattern formed with a portion of the surface of the layer 2 including a soft magnetic layer and other magnetic and nonmagnetic layers and a portion of the magnetic recording layer 3. The ALD protective layer 4 covers the bottom of the concave portions, the side walls of a magnetic recording layer 3, and the resin mold mask 6. Then, the resin mold mask 6 is removed together with the ALD protective layer 4 covering the resin mold mask 6 at the same time. As a result, the ALD protective layer 4 only covers the bottom of the concave portions and the side walls of the magnetic recording layer 3.

Figure 3D:
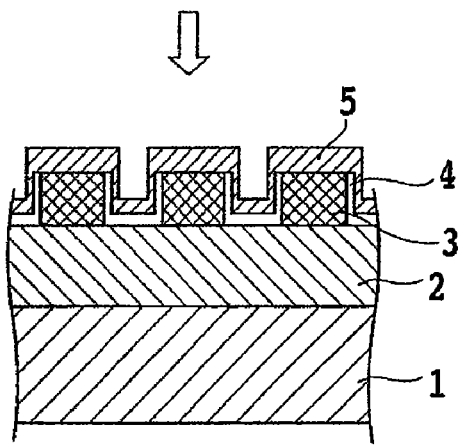

Then, as shown in FIG. 3(d), the surface of the magnetic recording medium having the ALD protective layer 4 is covered by a carbon protective layer 5. The carbon protective film can be deposited by a plasma CVD method, a physical vapor deposition (PVD) method, a sputtering method, or an FCA method. A diamond like carbon (DLC) film formed by a plasma CVD method, in particular, exhibits excellent smoothness, low friction coefficient, and excellent wear resistance. According to the manufacturing method as shown in FIGS. 3(a) through 3(d), the bottom of the concave portions and the side walls of the magnetic recording layer 3 in the concavo-convex pattern are covered with the ALD protective layer 4 and the carbon protective layer 5, improving the coverage. Although the number of steps is larger than that in the embodiment of FIGS. 1 and 2(a), 2(b), 2(c), the top of the convex portion is covered with only one layer of the carbon film, so that the distance between the head and the magnetic layer is shorter.

As described hereinbefore, the top of the convex portions of the concavo-convex pattern, which is closest to the flying head, is covered with the DLC film, which is dense, hard, and exhibits good wear resistance, so that little degradation of characteristics occurs due to wear by the head. The bottom of the concave portions and the side walls of the magnetic recording layer 3, on which a film is hardly deposited are covered by both the ALD protective layer 4 and the carbon protective layer 5. Thus, little metal dissolution occurs out of the layer 2 including a soft magnetic layer and other magnetic and nonmagnetic layers and the magnetic recording layer 3 and negligible corrosion is expected.

Example 1

Example 1 is an example of the embodiment shown in FIGS. 1 and 2(a), 2(b), 2(c)). A discrete track medium was fabricated having a predetermined concavo-convex pattern employing a nano-imprint method. Four types of media were fabricated having taper angles of the convex portions of the pattern of 40°, 50°, 60° and 80°.

Then, an ALD protective layer 4 was formed of $AL_2O_3$ having a thickness of about 2.0 nm on the concavo-convex pattern using an ALD apparatus. On the surface of the magnetic recording medium with the ALD protective layer 4 formed thereon, a carbon protective layer 5 was deposited by a sputtering method under a condition to deposit to a thickness of 1.5 nm.

Figure 4:
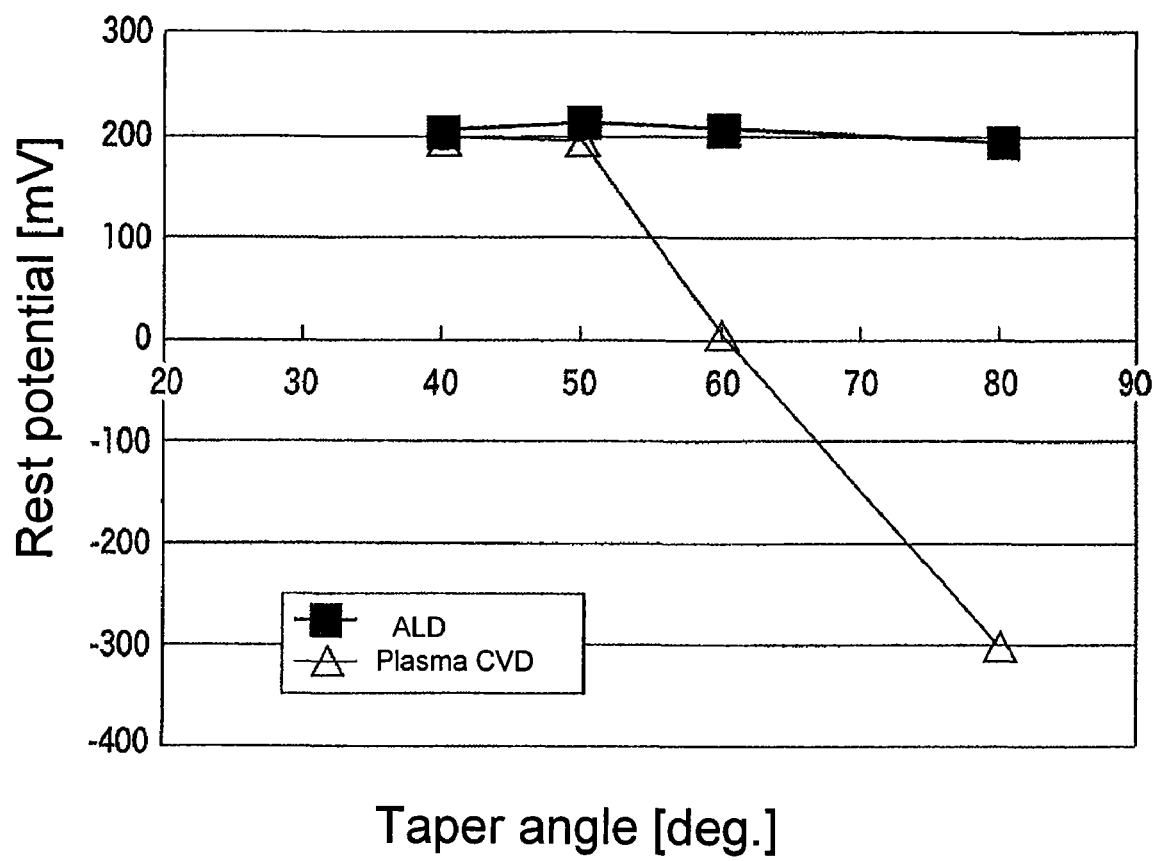
FIG. 4 shows a measurement result of rest potential obtained from an anode polarization curve measurement (a corrosion test)

To evaluate the coverage of the protective layer of the obtained magnetic recording medium, anode polarization curve measurement was conducted. To obstruct metal dissolution out of the surface except for the protective layer surface, the surface of the specimen outside a 16 mm diameter area was sealed by a jig. The specimen was immersed in 1 wt % $Na_2SO_4$ solution at 20° C. and anode polarization curve measurement was conducted. FIG. 4 shows the rest potential obtained in the measurement. The rest potential shows a potential after immersion in the solution for 3 minutes.

Comparative Example 1

A discrete track medium was fabricated having a predetermined concavo-convex pattern employing a nano-imprint method. Four types of media were fabricated having taper angles of the convex portions of the pattern of 40°, 50°, 60° and 80°.

Then, a protective layer was formed of a DLC film having a thickness of 3.0 nm on the concavo-convex pattern using a plasma CVD apparatus. On the surface of the magnetic recording medium with the protective layer formed thereon, a carbon film was deposited by a sputtering method under a condition to deposit to a thickness of 1.5 nm.

To evaluate the coverage of the protective layer of the obtained magnetic recording medium, anode polarization curve measurement was conducted. To obstruct metal dissolution out of the surface except for the protective layer surface, the surface of the specimen outside a 16 mm diameter area was sealed by a jig. The specimen was immersed in 1 wt % $Na_2SO_4$ solution at 20° C. and anode polarization curve measurement was conducted. FIG. 4 shows the rest potential obtained in the measurement. The rest potential shows a potential after immersion in the solution for 3 minutes.

When a protective layer is defective and the coverage is low, a magnetic layer becomes exposed to the solution and metal dissolves out, resulting in a low rest potential. When a protective layer has little defects and the coverage is high, metal dissolution out of the magnetic layer is suppressed resulting in a high rest potential. Comparing the rest potentials of magnetic recording media of Example 1 and Comparative Example 1 shown in FIG. 4, the specimens in which a protective layer was formed on the patterns of convex portions and concave portions by a plasma CVD apparatus showed lower rest potentials than the specimens in which a protective layer was formed by an ALD apparatus. This tendency was more significant with higher taper angles of convex portions. This shows that a plasma CVD apparatus can hardly deposit a protective layer on the side walls of convex portions resulting in low coverage. On the contrary, the specimens in which the protective layer was deposited by an ALD apparatus showed no variation in rest potential with the variation in the taper angle. This fact has demonstrated that the protective layer deposited by an ALD apparatus has excellent coverage over the concavo-convex configuration.

Example 2

Example 2 is an example of the embodiment of FIGS. 3(a), 3(b), 3(c), and 3(d)). A patterned magnetic recording layer 3 was formed on a layer 2 including a soft magnetic layer and other magnetic and nonmagnetic layers provided on a substrate 1. The magnetic recording layer was patterned by the nano-imprint method to form the same pattern as the one used in Example 1. A resin mold mask 6 was installed on the magnetic recording layer 3 of the magnetic recording medium. The resin mold mask 6 was formed by punching a polyimide film using the nano-imprint mold that was used for forming the pattern of the magnetic recording layer 3.

After installing the resin mold mask, a protective layer 10.0 nm thick was formed of $SiO_2$ using the ALD apparatus. Then, the resin mold together with the protective layer covering the resin mold mask was removed to expose the top of the magnetic recording layer. As a result, the ALD protective layer 4 covers only the part of the surface of the layer 2 including a soft magnetic layer and other magnetic and nonmagnetic layers that is the bottom of the concavo-convex pattern, and the side walls of the magnetic recording layer 3.

On the surface of the magnetic recording medium having the ALD protective layer 4 formed thereon, a carbon protective layer 5 was formed of a DLC film by a plasma CVD method.

Figure 5:
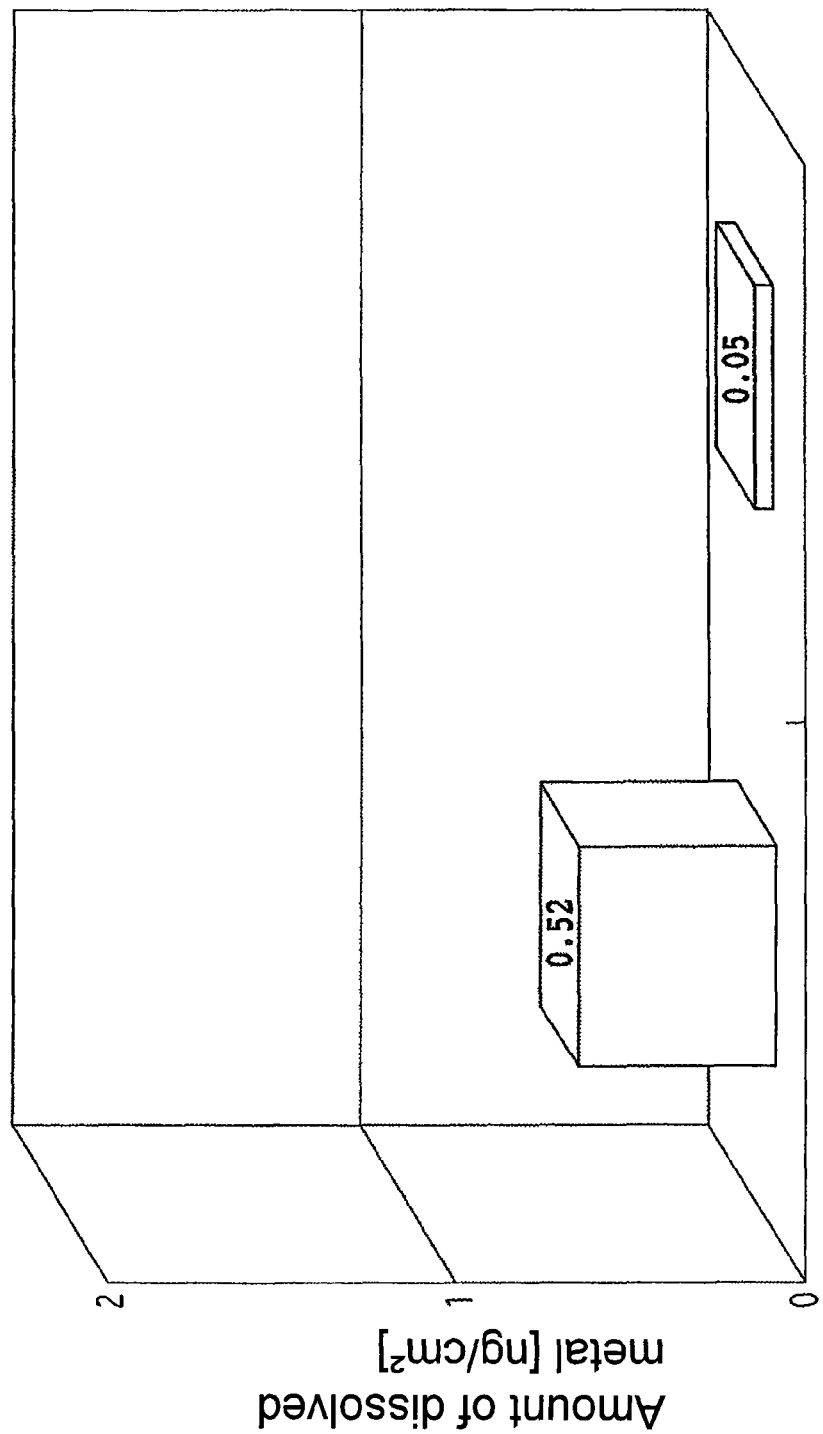
FIG. 5 shows a measurement result of a metal corrosion test on Example 2 and Comparative Example 2.

In order to evaluate the coverage of the ALD protective layer 4 and the carbon protective layer 5 of the obtained magnetic recording medium, a metal corrosion test was conducted. To obstruct metal dissolution out of an area except for the protective layer surface, the peripheral area of the specimen, which had the dimension of 20 mm×20 mm square, was sealed with a resin. After leaving the specimen in pure water at 80° C. for 1 hr, an amount of metal dissolved out into the pure water was measured. The result is shown in FIG. 5.

Comparative Example 2

A magnetic recording layer 3 was formed on a layer 2 including a soft magnetic layer and other magnetic and nonmagnetic layers provided on a substrate 1. The magnetic recording layer was patterned by the nano-imprint method to form the same pattern as the one used in Example 2. A protective layer of a DLC film was formed on the magnetic recording layer 3 of the magnetic recording medium using a plasma CVD apparatus. The protective layer was deposited under a condition to deposit to a thickness of 5.0 nm at the top and the bottom of the concavo-convex pattern. The resulting thickness at the side walls was 2.0 nm, which is less than half that at the top and the bottom.

In order to evaluate the coverage of the obtained protective layer of the magnetic recording medium, a metal corrosion test was conducted. To obstruct metal dissolution out of an area except for the protective layer, the peripheral area of the specimen, which has a dimension of 20 mm×20 mm square, was sealed with a resin. After leaving the specimen in pure water at 80° C. for 1 hr, an amount of metal dissolved out into the pure water was measured and compared with the result on Example 2.

FIG. 5 shows the amount of dissolved out metal of the magnetic recording media of Example 2 and Comparative Example 2. FIG. 5 shows that about ten times the amount of metal was dissolved out of the magnetic recording layer of the specimen of Comparative Example 2 having a conventional film deposited by the plasma CVD as compared with the specimen of Example 2 having two types of protective layers deposited by the ALD and the plasma CVD. This result can be considered to show that the protective layer was difficult to deposit on the side walls of the convex portions in Comparative Example 2 and was liable to generate pin-holes, so that the metal dissolved out through the pin-holes. In contrast, the results on the specimen of Example 2 demonstrated that even the magnetic recording layer with irregularities can be deposited with a dense protective layer formed on the magnetic recording layer.

Example 3

Example 3 is another example of the embodiment of FIGS. 3(a), 3(b), 3(c), and 3(d)). A magnetic recording layer 3 was formed on a layer 2 including a soft magnetic layer and other magnetic and nonmagnetic layers provided on a substrate 1. The magnetic recording layer was patterned by the nano-imprint method to form a predetermined pattern. A resin mold mask 6 was installed on the magnetic recording layer 3 of the magnetic recording medium. The resin mold mask was formed by punching a polyimide film using the nano-imprint mold that was used for forming the pattern of the magnetic recording layer.

After installing the resin mold mask, a protective layer 2.0 nm thick was formed of $Al_2O_3$ using the ALD apparatus. Then, the resin mold together with the protective layer covering the resin mold mask was removed to expose the top of the magnetic recording layer. As a result, the ALD protective layer 4 covers only the part of the surface of the layer 2 including a soft magnetic layer and other magnetic and nonmagnetic layers that is the bottom of the concavo-convex pattern, and the side walls of the magnetic recording layer.

On the surface of the magnetic recording medium having the ALD protective layer 4 formed thereon, a carbon protective layer 5 was formed of a DLC film by a plasma CVD method. The carbon protective layer 5 was deposited under a condition to deposit to a thickness of 3.0 nm. The thickness of the carbon protective layer 5 was 3.0 nm at the top of convex portions in coincidence with the target of the deposition condition. At the bottom of the concave portions, the thickness of the ALD protective layer was 2.0 nm and the carbon protective layer 5 on the ALD protective layer was 3.0 nm thick. At the side walls of the magnetic recording layer 3, the thickness of the ALD protective layer 4 was 2.0 nm, which was the same value as at the other places, while the thickness of the carbon protective layer 5 formed on the ALD protective layer was 1.5 nm, which was thinner than at other places.

Figure 6:
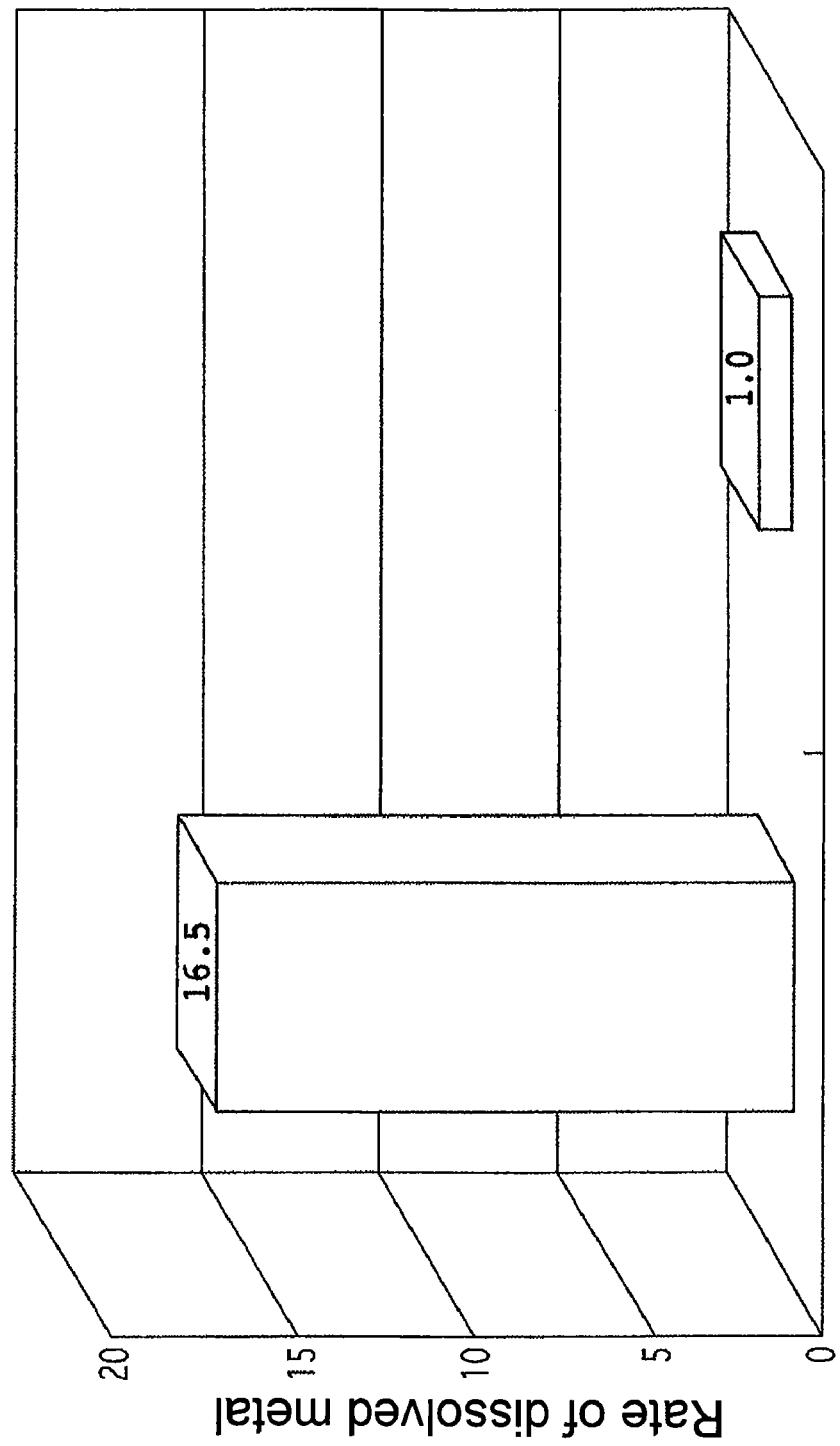
FIG. 6 shows a measurement result of a metal corrosion test on Example 3 and Comparative Example 3.

In order to evaluate the coverage of the ALD protective layer 4 and the carbon protective layer 5 of the obtained magnetic recording medium, a metal corrosion test was conducted. To obstruct metal dissolution out of an area except for the protective layer surface, the peripheral area of the specimen having the dimension of 20 mm×20 mm square was sealed with a resin. Immersing the specimen in 1 wt % $Na_2SO_4$ solution at 20° C. for 30 min, an anode polarization curve measurement was conducted. The amount of dissolved out metal was measured by analysis of the solution after the measurement. The result is shown in FIG. 6, which gives a rate of concentration of the dissolved metal out of the specimen with respect to a target concentration of dissolving metal.

Comparative Example 3

A magnetic recording layer 3 was formed on a layer 2 including a soft magnetic layer and other magnetic and nonmagnetic layers provided on a substrate 1. The magnetic recording layer was patterned by the nano-imprint method to form a predetermined pattern. A protective layer of a DLC film was formed on the magnetic recording layer 3 of the magnetic recording medium using the plasma CVD apparatus. The protective layer was formed under a condition to form a film 3.0 nm thick at the top and the bottom of the concavo-convex pattern. At the side walls, the resulted thickness was 1.5 nm, which was a half of the thickness in other places.

In order to evaluate the coverage of the protective layer of the obtained magnetic recording medium, a metal corrosion test was conducted. To obstruct metal dissolution out of an area except for the protective layer surface, the peripheral area of the specimen having the dimension of 20 mm×20 mm square was sealed with a silicone resin. Immersing the specimen in 1 wt % $Na_2SO_4$ solution at 20° C. for 30 min, an anode polarization curve measurement was conducted. The amount of dissolved out metal was measured by analysis of the solution after the measurement, and compared with the result on Example 3.

Comparing the amounts of dissolved out metal from the magnetic recording media of Example 3 and Comparative Example 3 shown in FIG. 6, it has been shown that 16.5 times of the amount metal was dissolved out of the magnetic recording layer deposited only by conventional plasma CVD compared to the amount of the specimen of Example 3. This result can be considered to show that the protective layer was difficult to deposit on the side walls of the convex portion in Comparative Example 3 and was liable to generate pin-holes, so that the metal dissolved out through the pin-holes. In contrast, the result on the specimen of Example 3 having two types of protective layers formed by the ALD and plasma CVD demonstrated that even the magnetic recording layer with irregularities can have a dense protective layer deposited on the magnetic recording layer.

Example 4

Example 4 is another example of the embodiment of FIGS. 1 and 2(a), 2(b), 2(c)). A bit-patterned medium was fabricated having predetermined dots using the nano-imprint method. The taper angle of the convex portions of the pattern was 90 degrees. Then, an ALD protective layer 4 of a $SiO_2$ film 5.0 nm thick was formed on the dots using an ALD apparatus. On the surface of the magnetic recording medium having the ALD protective layer 4 formed thereon, a carbon protective layer 5 was deposited by a sputtering method under a condition to deposit to a thickness of 1.0 nm.

Figure 7:
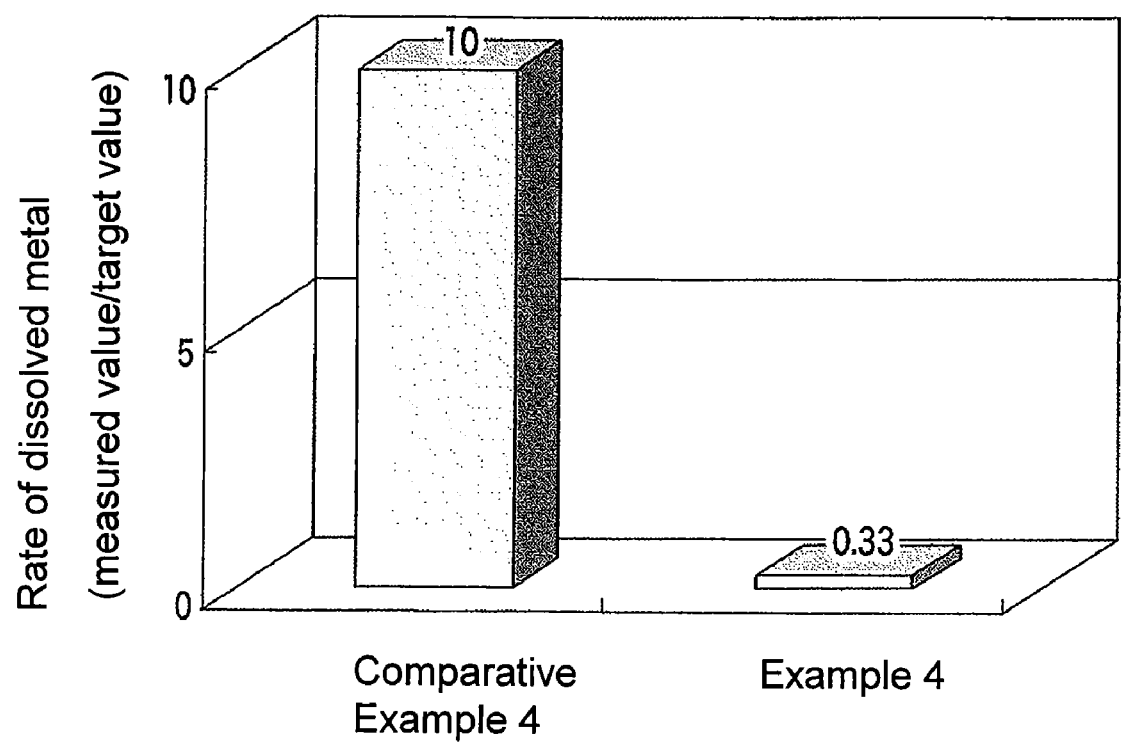
FIG. 7 shows a measurement result of a metal corrosion test on Example 4 and Comparative Example 4.

To evaluate the coverage of the protective layer of the obtained magnetic recording medium, a metal corrosion test was conducted. To obstruct metal dissolution out of the surface except for the protective layer surface, the surface of the specimen outside a 16 mm diameter area was sealed by a jig. The specimen was immersed in 1 wt % $Na_2SO_4$ solution at 20° C. for 30 min and an anode polarization curve measurement was conducted. The amount of dissolved out metal was measured by analysis of the solution after the measurement. FIG. 7 shows the result, which gives a rate of concentration of the dissolved metal out of the specimen with respect to a target concentration of dissolving metal.

Comparative Example 4

A bit-patterned media was fabricated having predetermined dots using the nano-imprint method. The taper angle of the convex portions of the pattern was 90 degrees. Then, a protective layer of a DLC film 5.0 nm thick was formed on the dots using a plasma CVD apparatus. On the surface of the magnetic recording medium having the protective layer formed thereon, a carbon film was deposited by a sputtering method under a condition to deposit to a thickness of 1.0 nm.

In order to evaluate the coverage of the protective layer of the obtained magnetic recording medium, a metal corrosion test was conducted. To obstruct metal dissolution out of an area except for the protective layer surface, the surface of the specimen outside a 16 mm diameter area was sealed by a jig. The specimen was immersed in 1 wt % $Na_2SO_4$ solution at 20° C. for 30 min and an anode polarization curve measurement was conducted. The amount of dissolved out metal was measured by analysis of the solution after the measurement, and compared with the result on Example 4. The result is shown in FIG. 7, which gives a rate of concentration of the dissolved metal out of the specimen with respect to a target concentration of dissolving metal.

Comparing the amounts of dissolved out metal from the magnetic recording media of Example 4 and Comparative Example 4 shown in FIG. 7, it has been shown that ten times the amount of metal was dissolved out of the magnetic recording layer deposited by conventional plasma CVD only with respect to the target dissolution quantity. This result can be considered to show that the protective layer was difficult to deposit on the side walls of the convex portion in Comparative Example 4 and liable to generate pin-holes, so that the metal dissolved out through the pin-holes that happened to be present in the protective layer. In contrast, the metal dissolution out of the specimen having the protective layer formed by the ALD apparatus was one third of the target value. It has been demonstrated that even the magnetic recording layer with irregularities has a dense protective layer deposited on the magnetic recording layer.

Comparative Example 5

Figure 8:
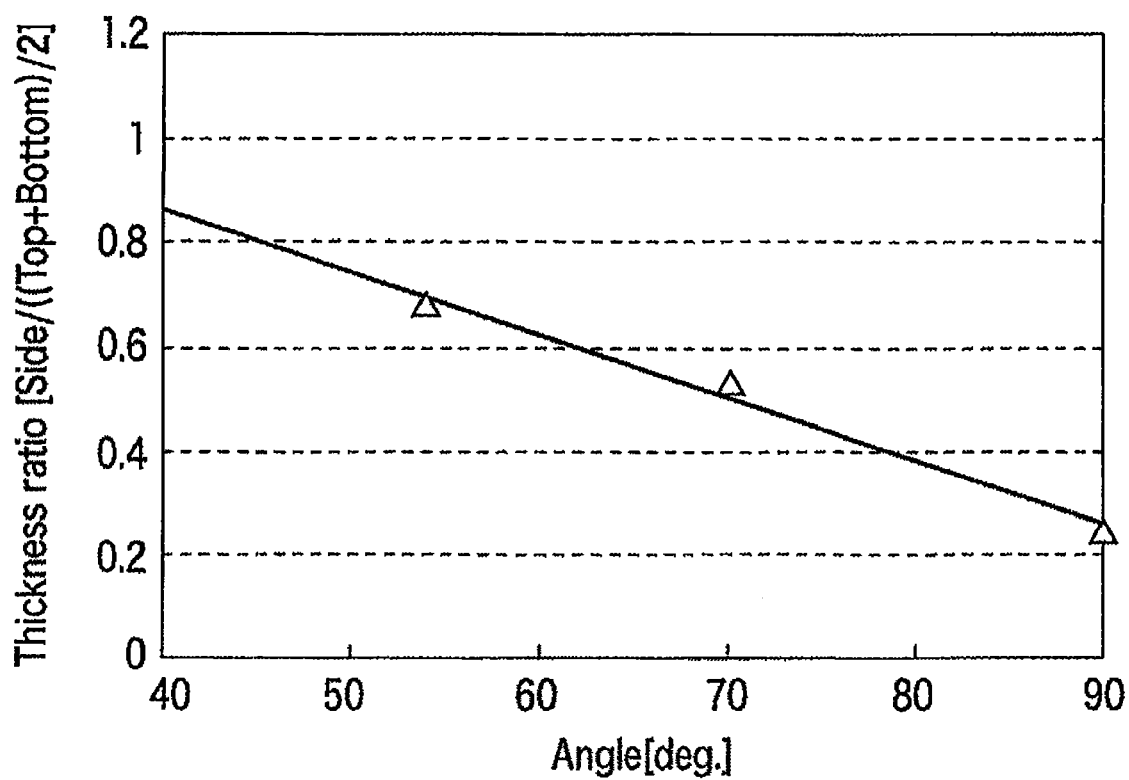
FIG. 8 shows a simulation result of the relationship between taper angles and thickness ratios.

Samples having a concavo-convex pattern simulating a concavo-convex pattern of discrete track media with taper angles of 54° and 90° were prepared. A DLC film was deposited on the sample by a plasma CVD method. The ratio of the thickness of the side wall to the mean value of thicknesses of the top and the bottom was calculated. A simulation was conducted based on those data. The result of simulation calculation obtained by assuming an adhesion probability of 1.0 gave an approximation closest to the result on the samples. FIG. 8 shows the calculation results for 54°, 70° and 90°. The adhesion probability is an indicator of readiness for the precursors to be adhered. A small value of the probability means that adhesion occurs after multiple times of reflection and uniform adhesion is performed on the trench, giving a good condition of coverage. The case of probability of 1.0, in which the precursors are not reflected but directly adhered, is the condition of worst coverage.

The result of the simulation showed that the thickness at the side walls was less than 60% of the mean thickness at the top and the bottom when the taper angle is larger than about 60 degrees. The result of FIG. 4 showed that corrosion (metal dissolution) increased at the taper angles larger than 60 degrees. Because these results have shown that the plasma CVD method gives poor coverage on the side walls of the convex portions in the case of taper angles larger than about 60 degrees, some other deposition method is necessary for that range of taper angle.

The present invention provides a magnetic recording medium that exhibits good corrosion resistance. Although the invention has been described with respect to certain preferred embodiments thereof. It will be understood that modifications and variations are possible within the scope of the appended claims.

What is claimed is:

1. A method of manufacturing a magnetic recording medium having a concavo-convex pattern with a convex portion for recording information and a concave portion without a recording function, the method comprising:

forming an ALD protective layer on the magnetic recording medium using an ALD (atomic layer deposition) method, wherein the ALD protective layer is formed on side walls of the convex portions of the magnetic recording layer and on bottoms of the concave portions of the concavo-convex pattern and is lacking on the tops of the convex portions, wherein the ALD protective layer comprises a material selected from a group consisting of oxides, nitrides and a metal film, and forming a carbon protective layer composed of a DLC film at least on tops of the convex portions of the magnetic recording layer, wherein the carbon protective layer composed of a DLC film is formed on the ALD protective layer on the side wall of the convex portions of the magnetic recording layer.

2. The method of manufacturing a magnetic recording medium according to claim 1, wherein the carbon protective layer composed of a DLC film additionally is formed on the ALD protective layer on the bottom of the concave portions of the magnetic recording layer.

3. The method of manufacturing a magnetic recording medium according to claim 1, wherein the carbon protective layer is formed by means of a plasma CVD method.

4. The method of manufacturing a magnetic recording medium according to claim 1, wherein the ALD protective layer is formed by masking the tops of the concave portions of the magnetic recording layer.

5. The method of manufacturing a magnetic recording medium according to claim 1, wherein the ALD protective layer is formed following a configuration of the magnetic recording layer.

6. The method of manufacturing a magnetic recording medium according to claim 5, wherein a carbon protective layer is formed on the ALD protective layer by means of a sputtering method.

7. The method of manufacturing a magnetic recording medium according to claim 1, wherein a configuration of the concavo-convex pattern is a configuration of lines and spacings or a configuration of dots.

8. The method of manufacturing a magnetic recording medium according to claim 1, wherein the ALD protective layer is composed of a material selected from a group consisting of $SiO_2$, $Al_2O_3$, $TiO_2$, $HfO_2$, TiN, AlN, WN, and a metal film.

9. A magnetic recording medium comprising
a concavo-convex pattern having a convex portion for recording information, and a concave portion without a recording function, and a protective layer on the convex portion and the concave portion, wherein the protective layer comprises an ALD protective layer formed by means of an ALD method, the ALD protective layer comprising a material selected from a group consisting of oxides, nitrides and a metal film, wherein the ALD protective layer is formed at least on side walls of the convex portions of the magnetic recording layer and is lacking on the tops of the convex portions and wherein the ALD protective layer is formed further on bottoms of the concave portions of the concavo-convex pattern, and wherein the protective layer further comprises a carbon protective layer composed of a DLC film which is formed at least on tops of the convex portions of the magnetic recording layer, wherein the carbon protective layer composed of a DLC film is formed on the ALD protective layer on the side wall of the convex portions of the magnetic recording layer.

10. The magnetic recording medium according to claim 9, wherein the carbon protective layer composed of a DLC film is formed on the ALD protective layer on the bottom of the concave portions of the magnetic recording layer.

11. The magnetic recording medium according to claim 9, wherein a taper angle of the convex portions of the concavo-convex pattern is at least 60 degrees, and the ALD protective layer is formed on the side walls of the convex portions with the taper angle of at least 60 degrees.

12. The magnetic recording medium according to claim 9, wherein the ALD protective layer is formed following a configuration of the magnetic recording layer.

13. The magnetic recording medium according to claim 9, wherein a configuration of the concavo-convex pattern is a configuration of lines and spacings or a configuration of dots.

14. The magnetic recording medium according to claim 9, wherein the ALD protective layer is composed of a material selected from a group consisting of $SiO_2$, $Al_2O_3$, $TiO_2$, $HfO_2$, TiN, AlN, WN, and a metal film.

* * * * *